(12) United States Patent
Pickering et al.

(10) Patent No.: US 7,226,067 B2
(45) Date of Patent: Jun. 5, 2007

(54) FLEXIBLE TRAINING WHEEL ASSEMBLY

(76) Inventors: Graham William Pickering, 73 Kilgour St., Geelong VIC 3220 (AU); Gary Wayne Yewdall, 4 Margaret St, Rippleside Geelong VIC 3215 (AU)

( * ) Notice: Subject to any disclaimer, the term of this patent is extended or adjusted under 35 U.S.C. 154(b) by 0 days.

(21) Appl. No.: 10/540,664

(22) PCT Filed: Dec. 23, 2003

(86) PCT No.: PCT/AU03/01721

§ 371 (c)(1),
(2), (4) Date: Jun. 23, 2005

(87) PCT Pub. No.: WO2004/056644

PCT Pub. Date: Jul. 8, 2004

(65) Prior Publication Data

US 2006/0043780 A1    Mar. 2, 2006

(30) Foreign Application Priority Data

Dec. 23, 2002    (AU) .............................. 2002953539

(51) Int. Cl.
*B62H 1/12* (2006.01)
(52) U.S. Cl. ........................ 280/293; 280/304; 280/298

(58) Field of Classification Search ................ 280/293, 280/288.4, 298, 301, 304
See application file for complete search history.

(56) References Cited

U.S. PATENT DOCUMENTS

| 2,450,979 | A | * | 10/1948 | Moller ........................ 280/293 |
| 4,038,717 | A | | 8/1977 | Greathouse |
| 4,278,726 | A | | 7/1981 | Wieme |
| 6,102,379 | A | * | 8/2000 | Ponslet et al. .............. 267/136 |
| 6,113,122 | A | | 9/2000 | Plana |
| 6,641,121 | B1 | * | 11/2003 | Carlstedt et al. ............ 267/219 |
| 6,685,201 | B1 | | 2/2004 | Smith, III |

FOREIGN PATENT DOCUMENTS

| EP | 1 270 390 A1 | 1/2003 |
| WO | WO 95/09759 | 4/1995 |
| WO | WO 02/053647 A1 | 7/2002 |

* cited by examiner

*Primary Examiner*—Tony Winner
(74) *Attorney, Agent, or Firm*—Brooks Kushman P.C.

(57) ABSTRACT

A flexible training wheel assembly fitted on each side of the rear wheel (10) of a bicycle, each training wheel assembly comprising: an upper bracket (1) removeably attached to the bicycle axle (11), a visco-elastic connector (2) attached to the upper bracket (1), and a lower arm (3) attached to the visco-elastic connector (2) at one end and to a training wheel (6) at the other end.

8 Claims, 4 Drawing Sheets

US 7,226,067 B2

FLEXIBLE TRAINING WHEEL ASSEMBLY

FIELD OF THE INVENTION

The invention relates to the flexible training wheel assembly that is attached to the rear wheel of the bicycle to assist children to develop the balancing skill necessary to ride a bicycle.

BACKGROUND OF THE INVENTION

Commercially available training wheel assemblies typically comprise rigid brackets rigidly attached to the bicycle rear wheel axle. This rigidity inhibits the learning process. If the wheels are set low, the bicycle cannot be leaned at all, either to make a turn or just to compensate for riding on a cambered surface. If the wheels are set high the bicycle will lurch from side to side in an unnerving manner and, once the rider is leaning on one outrigger wheel, there is no restorative force acting to encourage the rider to regain the central equilibrium position.

A number of patents have been registered showing various designs, which attempt to address this problem. Most of the configurations proposed incorporate a suspension system based on the concept of a pivoted bracket supported by a spring, with the various fittings and fasteners required to retain the spring, whilst permitting the desired range of movement.

Some of these devices are quite complex and cumbersome, for example that disclosed in U.S. Pat. No. 4,810,000. In this design, the training wheels are raised and lowered by cables attached to the front wheel forks of the bicycle, which activates the cables as the front wheel is turned. As well as complexity and cost, this device has the added drawback that the movement of the training wheels is reliant upon correct adjustment of the mechanism, rather than simply responding to the normal lean of the rider.

Simpler, more viable designs typically employ a hinged bracket supported by a compression spring, plus the necessary fittings and fasteners. Typical of these devices are those disclosed in U.S. Pat. Nos. 5,064,213, 5,100,163 and 5,352,403.

These designs appear to be functional, however, since none appear to have been commercialized their principal drawback would seem to be cost to manufacture; they also have a "gadgety" appearance, which may not appeal to the market.

More importantly, the exposed coil spring design presents numerous pinch-points for trapping and injuring small fingers, which is a significant drawback.

The simplest design is that disclosed in U.S. Pat. No. 6,113,122 and previously in U.S. Pat. No. 5,707,069. It's main feature is that it combines the structural support of the outrigger wheel and the flexible spring action desired in the one element, namely a helically wound torsion spring.

This design appears to be functional and relatively cheap to manufacture. However, it may lack torsional rigidity about the vertical rod part of the member, allowing excessive fore and aft movement of the outrigger wheel. This would be especially so if the assemblies were installed back to front (ie. on the wrong sides), as the helical spring would then tend to open, rather than close.

The assemblies would need to be marked clearly "Left" and "Right" hand and would need to be installed correctly so. In addition, the steel torsion spring has virtually no inherent damping available to damp out unwanted oscillations or vibration.

SUMMARY OF THE INVENTION

It is an object of the present invention to provide a stabilizing device for bicycles that also allows the novice rider to develop a natural feel for the behaviour of a bicycle, particularly over uneven or sloping ground.

It is another object of the present invention to provide a stabilizing device for bicycles that is simple in construction and economical to manufacture.

It is another object of the present invention to provide a stabilizing device, as described above, that is easy to install and easy to adjust to reduce in effect, as the skill of the rider increases.

The present invention has an upper bracket member and a lower arm member flexibly joined via a visco-elastic connector, which allows for angular movement between the two members, provides a spring force to progressively oppose the angular displacement and has inherent damping characteristics to damp out unwanted oscillations/vibration.

The upper bracket has a slotted hole near its upper end to allow the bracket to be attached to the rear wheel axle and for the position of the bracket to be adjusted vertically. The geometry of the assembly is such as to apply a pre-load to the flexible connector when the bicycle stands upright, under the weight of the rider. The amount of pre-load may be adjusted to suit the weight and/or skill level of the rider, by adjusting the height of the upper bracket via the slotted hole.

The upper bracket is also shaped to fit over an inner, lugged guide bracket, which allows the upper bracket to be adjusted vertically whilst maintaining its correct, substantially vertical orientation.

The training wheel is attached to the outer end of the lower arm, in a conventional manner.

DETAILED DESCRIPTION OF THE PREFERRED EMBODIMENT

Figure 1:
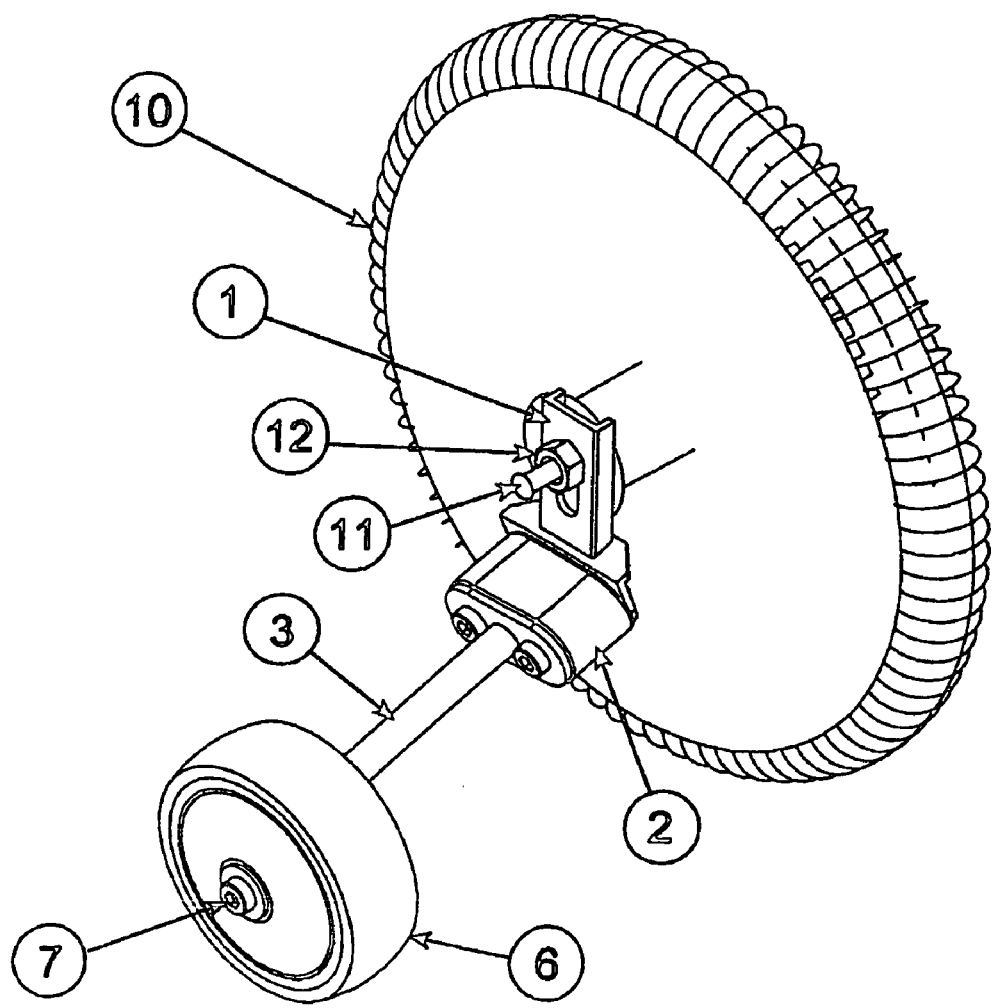
FIG. 1 is a perspective view showing a training wheel assembly connected to a bicycle rear wheel axle.
Figure 2:
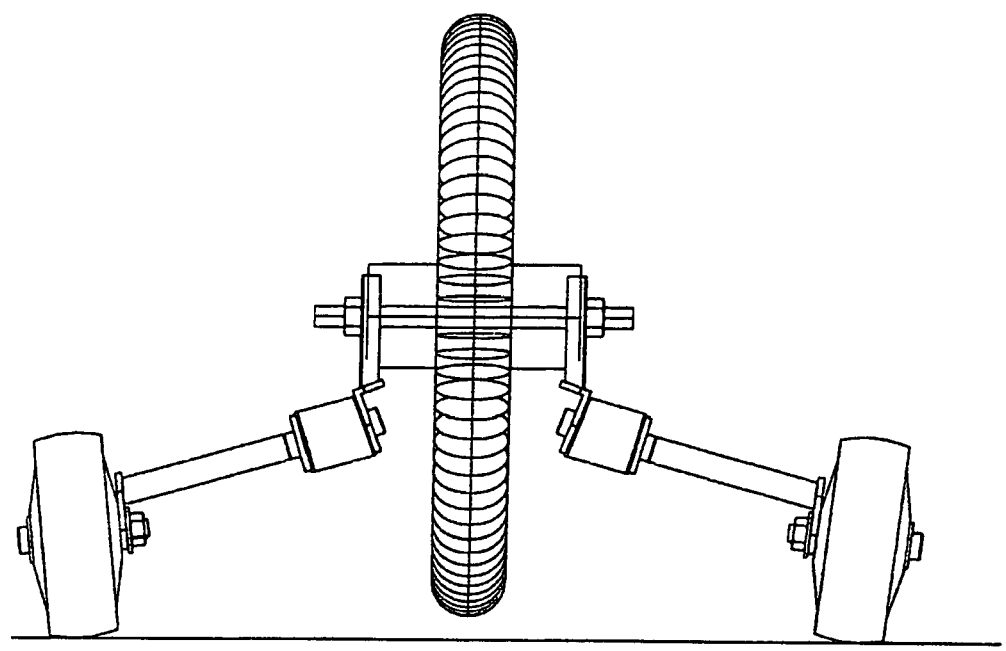
FIG. 2 is a rear view of a pair of training wheels affixed to the rear wheel of a bicycle in the unloaded state.
Figure 3:
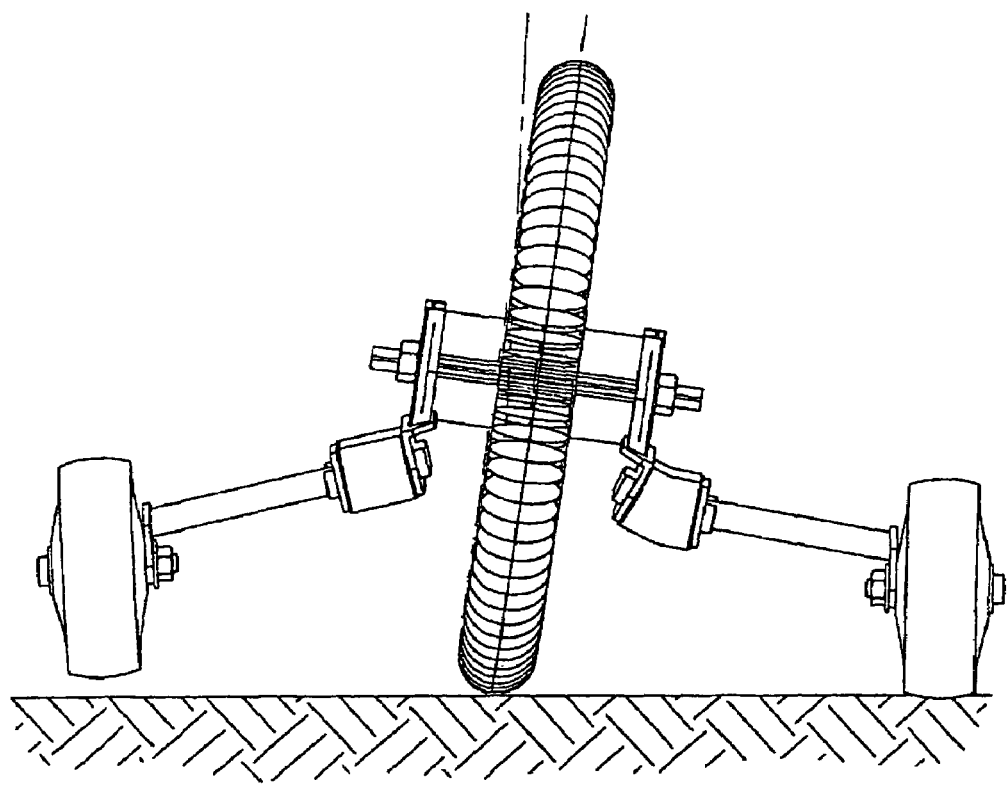
FIG. 3 illustrates a pair of training wheels of a bicycle during a turning maneuver.
Figure 4:
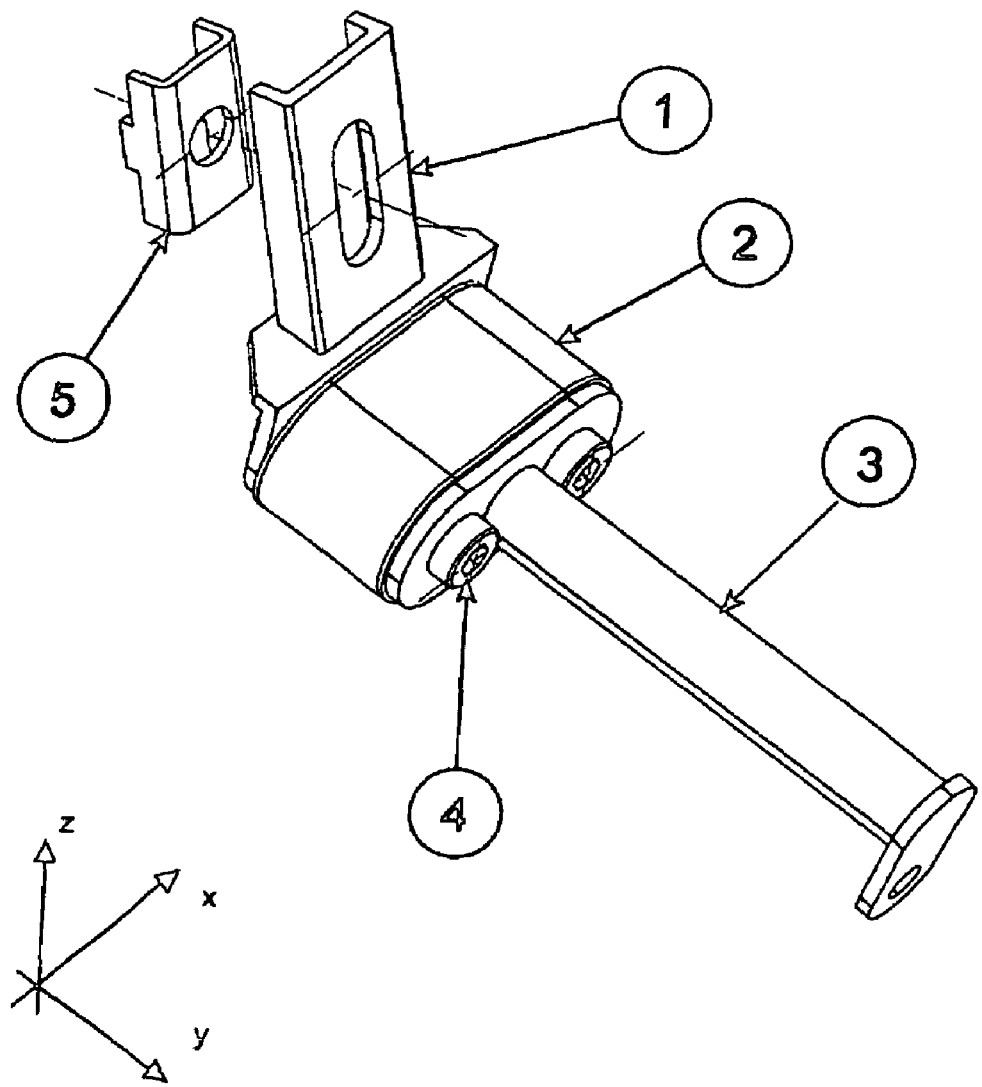
FIG. 4 is an enlarged perspective view of a training wheel linkage assembly.

The preferred embodiment of a training wheel assembly of the present invention is shown and described with reference to the accompanying drawings FIGS. 1–4.

The upper bracket (1) is channel shaped in the upper portion, to allow it to locate around the guide bracket (5), yet move vertically for adjustment. The lower portion slopes backward so that its face makes an angle to the vertical (about 20°–30°) to achieve a suitable geometry for the linkage, depending upon the diameter of bicycle wheel and diameter of training wheel in question.

The visco-elastic connector (2) is bonded or fastened to the lower face of the upper bracket. The visco-elastic connector has a dimension in the fore-aft (x) direction of approximately twice the dimension in the vertical (z) direction. The dimension in the lateral direction (y) is selected to be compatible with x & z dimensions. All dimensions and the type and hardness of the polymer compound are selected to give the desired spring rate. (Perhaps two different models may be required to cover the range of bicycle sizes and weights of riders.)

The lower arm (3) is bonded or fastened to the visco-elastic connector (2), at its upper face plate.

The lower end of this member has a tab bracket or similar provision for accepting the wheel fastener (bolt, typically). The face of this tab bracket is set at an angle to the lower arm (about 70°–90°) to ensure that the alignment of the axis of the training wheel matches the rest of the geometry of the linkage assembly and that the training wheel is approximately vertical under typical pre-load conditions.

The lower arm is sized to carry the loads imposed upon it and to meet the required geometry of the linkage.

The guide bracket (5) is a conventional type, either solid or channel shaped, with a hole through the centre for the rear wheel axle to pass through. The guide bracket also has a lug on one side, sized to mate with the slot in the typical bicycle rear fork.

When this lug is correctly located in the slot, the guide bracket is prevented from rotating, ensuring that the training wheel assembly remains in the correct, substantially vertical, alignment. The design of the present invention is sufficiently robust that its function is not significantly affected by alignment variations normally encountered from bicycle to bicycle.

The guide bracket is sized to fit neatly within the channel section of the upper bracket (1).

The invention claimed is:

1. A training wheel assembly to be fitted to a rear wheel of a bicycle for providing lateral dynamic stability of the bicycle, a pair of such training wheel assemblies to be used concurrently on opposite sides of a bicycle rear wheel, each of said training wheel assemblies comprising:
    an auxiliary wheel;
    a lower arm having an inboard end and an outboard end, the auxiliary wheel being pivotally attached to the lower arm outboard end;
    a mounting bracket adapted to be removably attached to the bicycle rear axle;
    a visco-elastic polymer connector having an inboard surface attached to the mounting bracket and outboard surface attached in series to the inboard end of the lower arm;
    wherein the visco elastic polymer connector of each of the pair of training wheel assemblies biases the rear wheel toward a vertical orientation and elastically bends as the rear wheel leans during a turning maneuver in response to the auxiliary wheel contacting the ground.

2. The training wheel assembly of claim 1, wherein the mounting bracket has a slotted hole found therein to allow vertical adjustment of the wheel assembly to allow adjustment of the amount of pre-load applied to the visco-elastic polymer connector, to suit the weight and skill level of a rider of the bicycle.

3. The training wheel assembly of claim 1, the visco-elastic polymer connector having a spring effect to allow a rider to lean the bicycle when turning to progressively oppose the lean of the bicycle, to assist the rider to maintain balance.

4. The training wheel assembly of claim 1, the visco-elastic polymer connector having an inherent damping effect to absorb energy and damp out undesirable oscillation and vibration of the training wheel.

5. The training wheel assembly of claim 1, wherein the visco-elastic polymer connector has greater stiffness in the fore and aft direction to ensure that the training wheel remains substantially parallel to the bicycle rear wheel during use.

6. The training wheel assembly of claim 5, wherein the visco-elastic polymer connector has two fasteners oriented side by side in a fore and aft direction.

7. The training wheel assembly of claim 5, wherein the visco-elastic polymer connector has a significantly greater dimension in the fore-aft direction than in the lateral direction.

8. The training wheel assembly of claim 5, wherein the visco-elastic polymer connector has a significantly greater dimension in the fore-aft direction than in the vertical direction.

* * * * *